Feb. 11, 1930. H. O. ROSS 1,746,286
INDEX OR RECORD
Filed Aug. 26, 1926 3 Sheets-Sheet 1

INVENTOR
Herbert O. Ross.
By Ralph Kalish
ATTORNEY

Feb. 11, 1930.  H. O. ROSS  1,746,286
INDEX OR RECORD
Filed Aug. 26, 1926  3 Sheets-Sheet 2
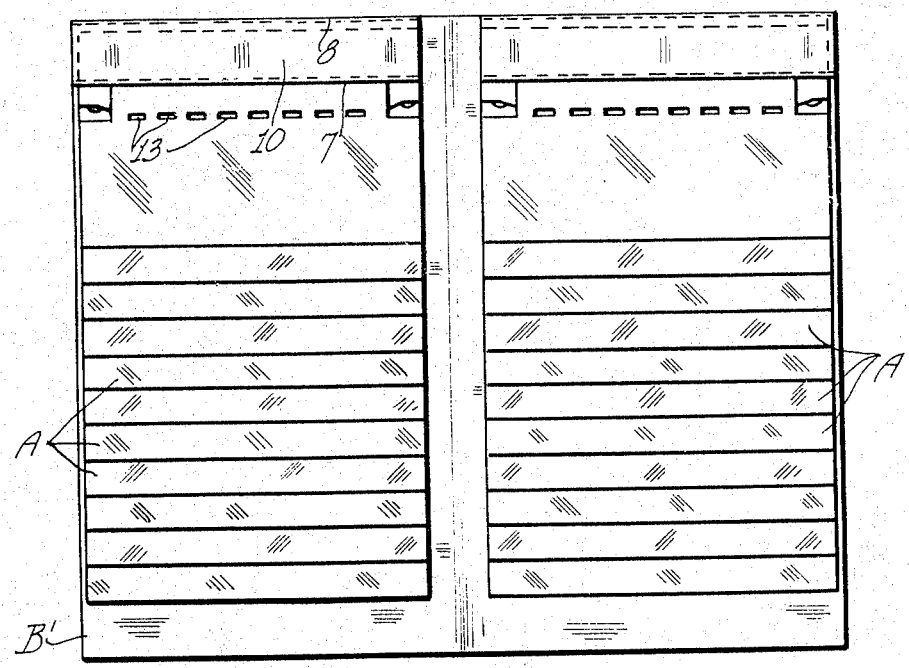
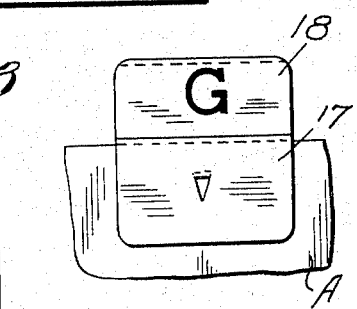
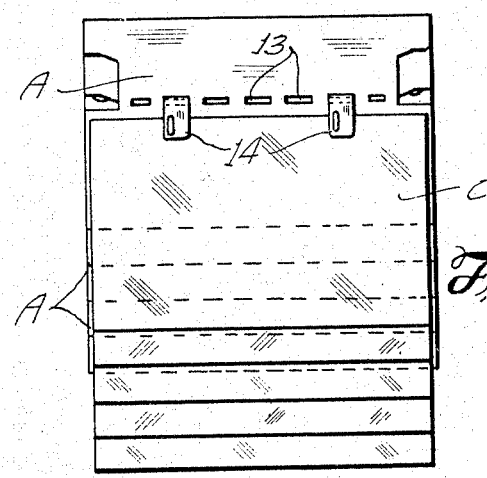
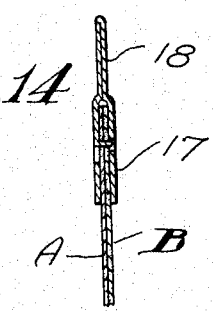
INVENTOR
Herbert O. Ross.
BY
ATTORNEY Feb. 11, 1930.  H. O. ROSS  1,746,286
INDEX OR RECORD
Filed Aug. 26, 1926  3 Sheets-Sheet 3

INVENTOR
Herbert O. Ross.
By Ralph Reich
ATTORNEY

Patented Feb. 11, 1930

1,746,286

UNITED STATES PATENT OFFICE

HERBERT O. ROSS, OF ST. LOUIS, MISSOURI

INDEX OR RECORD

Application filed August 26, 1926. Serial No. 131,663.

This invention relates generally to indexes, records, lists, and the like and, more particularly, to a certain new and useful improvement in sectional indexes or records of the type that includes a plurality of separate so-called individual or record sections or cards.

My present invention has for its object the improvement and amplification generally of the sectional index or record shown and described in my co-pending application serial No. 747,936, filed November 5, 1924.

And with the above and other objects in view, my present invention resides in the novel features of form, construction arrangement, and combination of parts hereinafter described and pointed out in the claims.

In the accompanying drawings,—

Figure 6 is a plan view of two records or indexes of my invention mounted upon a backing-sheet or holder, the latter being of a size for folding upon itself into book-form;

Figure 7 illustrates in plan view a connected series of the record-sections equipped with, and by means of fastening clips supporting, additional cards or record-sections of standard form;

Figure 1:
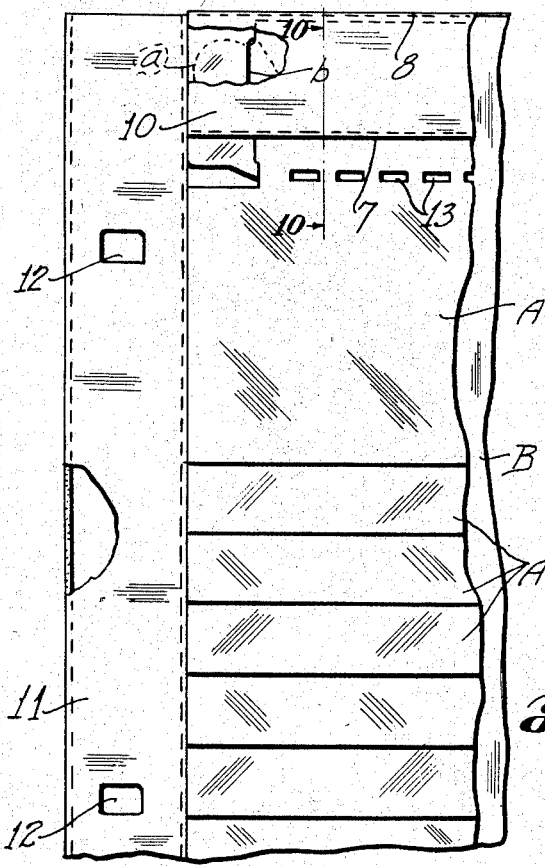
Figure 1 is a fragmental plan view, partly broken away, of a sectional index or record embodying my present invention.
Figure 2:
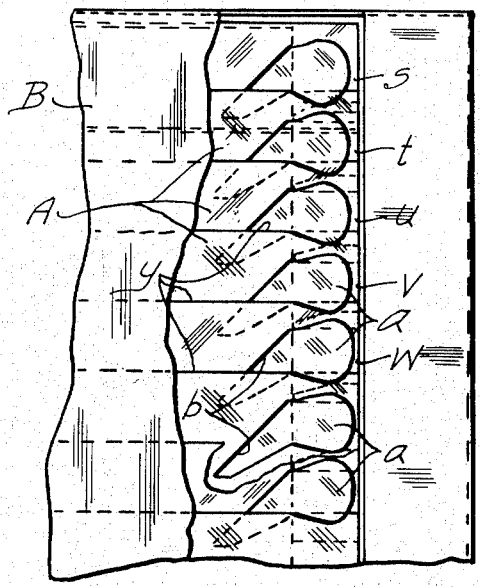
Figure 2 is a fragmental inverted plan view, also partly broken away, of the index or record of Figure 1.
Figure 8:
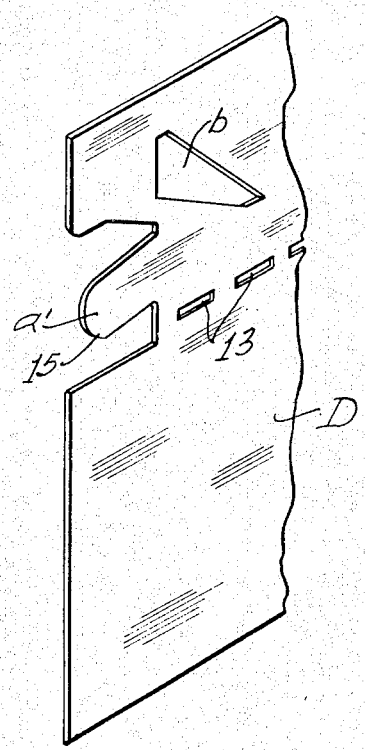
Figure 8 shows in enlarged perspective a fragment of a slightly modified individual record-section or card embodying my invention.
Figure 9:
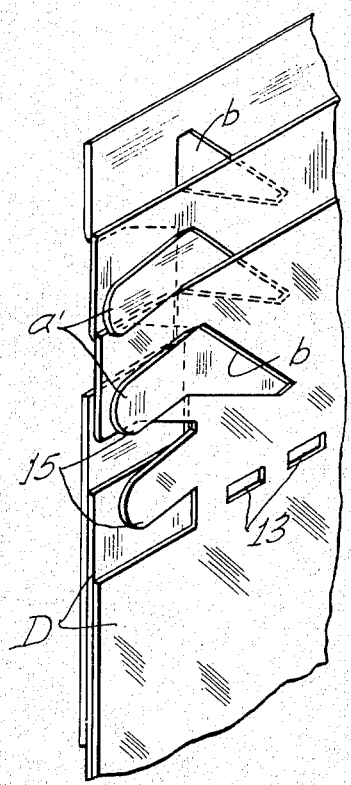
Figure 9 shows in enlarged fragmental inverted perspective a plurality of the cards or sections of Figure 8 in connected or interlocked relation.
Figure 9A:
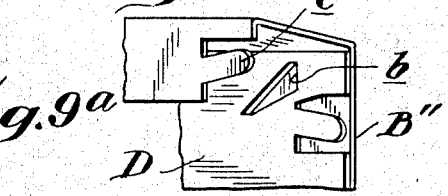
Figure 11:
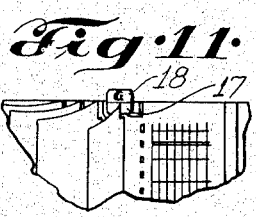
Figure 10:
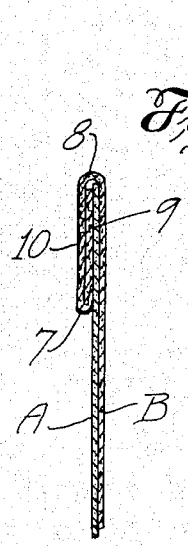
Figure 12:
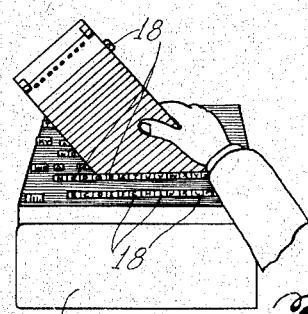

Figure 9ª is a fragmental view illustrating in assembling relation a modified record section or card of Figure 8 in connection with a backing-sheet or holder;

Figure 10 is a detail transverse sectional view taken approximately on the line 10—10, Figure 1;

Figure 11 is a fragmental elevational view of a backed index or record of my invention equipped with an index-tab for facilitating location thereof within a file or cabinet;

Figure 12 is an elevational view illustrating the placement within a file of the index-tab equipped record of Figure 11; and Figures 13 and 14 are enlarged fragmental elevational and sectional views, respectively, of the index-tab shown in Figures 11 and 12.

Referring now more in detail and by reference characters to the drawings, A, A, designate the like separate individual record-sections or cards of the index, each of which cards or sections is constructed of some flexible material, such, for instance, as suitable light-weight cardboard, and each of which is of suitable predetermined length and breadth. For purposes of the present description, the length dimension, as I will term it, of each section or card is the distance from one side or so-called vertical edge to the opposite side or vertical edge and the breadth dimension, as I will term it, of each section or card is the distance from the upper so-called horizontal edge to the lower horizontal edge thereof.

Figures 3, 4:
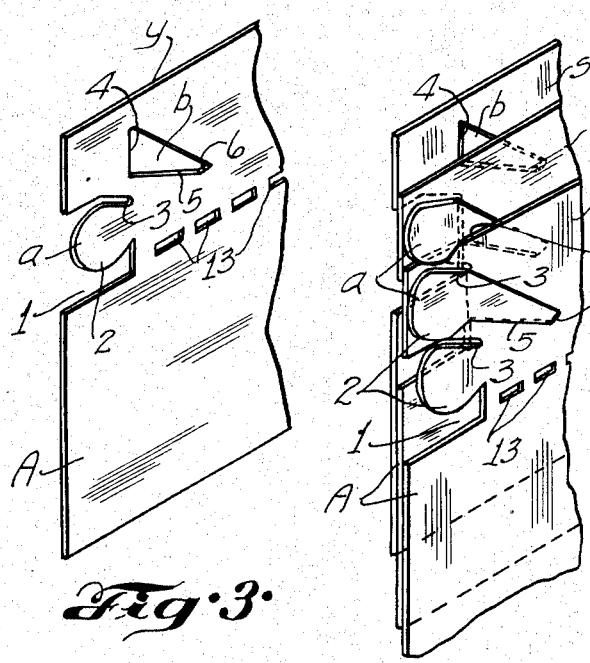
Figure 3 shows in enlarged perspective a fragment of one of the individual record-sections or cards.
Figure 4 shows in enlarged fragmental inverted perspective a plurality of the individual record-sections or cards of Figure 3 in interlocked imbricated or overlapping relation.
Figure 5:
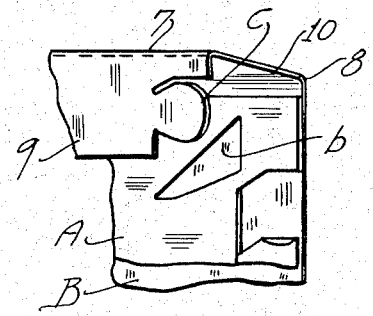
Figure 5 is a fragmental view illustrating in assembling relation a plurality of the cards in connection with a preferred type of backing-sheet or holder.

Each of said cards or sections A, as best seen in Figure 3, is upon its opposite side edges and adjacent its upper edge inwardly cut away or recessed, as at 1, and formed upon the card and lying within the respective recesses 1, is a pair of substantially identical horizontally aligned opposed tenons or tongues *a*. Preferably the tongues *a* bodily project horizontally of the card-section with their free ends presented toward the side edges of the card, and each at a suitable point within its length, as at 2, has a breadth dimension somewhat greater than the breadth dimension of the neck 3 thereof.

Each card or section A, as also seen in Figure 3, is further formed suitably adjacent its opposite side or so-called vertical margins with a pair of openings b generally of triangular shape and providing opposed substantially identical obtuse angular slots. The slots or openings b are for the most part disposed more closely adjacent the upper horizontal edge of the card than are the tongues a, and each of said slots or openings at its vertically disposed wall 4 substantially aligns with, and has a breadth dimension approximately equal to the breadth dimension of, the tongue-neck 3. It will be noted that the lower wall 5 of each slot trends obliquely inwardly and downwardly to a point, as at 6, somewhat below the horizontal plane of the upper end of the tongue-neck 3, the slots or openings b of each respective card being also horizontally aligned relatively thereof.

In now initially assembling a plurality of the sections or cards A in index or record formation, a pair of the cards, as, for instance, cards s and t, best seen in Figure 4, are disposed in approximately flatwise superposed relation, the one card s suitably bodily flexed, and its tongues a inserted endwise within the openings or slots b of the second card t. A third card u is then disposed substantially flatwise under the second card t, and the tongues a of the second card t inserted endwise within the openings or slots b of the third card u. A fourth card v is now disposed approximately flatwise under the third card u, and the tongues a of the third card u, in turn, inserted endwise within the openings or slots b of the fourth card v, and so on throughout the series of any desired number of the cards. As so inserted, the tongues a of the first card s will be partly over the upper marginal edge portion y of the third card and the tongues a of the second card t will be partly over the upper marginal edge portion y of the fourth card v, and with the several cards so disposed in overlapping relation, it will be noted that the second card t at its upper marginal edge-portion y lies partly under or to the rear of the inclined wall 5 of the slots b of the upper card s, and that the third card u similarly partly underlies the slots or openings b of the second card t, and so on throughout the series. With the several cards so arranged and connected they are, as will be noted, disposed in an imbricated or overlapping series with a portion of each respective card exposed and visible and with each card partly underlying and restricting the dimensions of the slots or openings b of the card in front thereof. The so inserted tongues a of the uppermost or first card and the upper marginal edge portion y of the third card u are now so relatively flexed as to dispose such marginal edge portion of the third card u over or in front of breadthwise extended or enlarged portions 2 of the tongues a of the first card s, or, reversely, such extended portions 2 of the tongues a of the first card s are disposed under or to the rear of the marginal edge portion y of the third card u as indicated in Figure 4. With the tongues a of the first card s so engaged with the third card u, and the second card t similarly engaged with the fourth card v, the several described cards are, as will be seen, detachably secured together in slot-restricting relation. The several cards are thus interlocked in an imbricated or overlapping series and present, with a portion of each card exposed, a substantially continuous, though sectional, sheet for the recording or indexing of names, information, data, and the like.

In a similar manner, a fifth card w may be disposed under the fourth card v and interlocked at its inserted tongues a with the marginal edge portion of the next alternate card thereabove, and in such manner and by additional individual cards or sections, the index or record may be extended and enlarged to meet any particular requirements.

Preferably to facilitate the handling of the connected or interlocked cards A and their insertion in a file, desk-drawer, or the like, I provide a holder comprising a backing-sheet B of relatively heavy paper-board or light sheet metal provided or formed upon its opposite side edges and adjacent its upper margin with a pair of tongues c substantially identical with the card-tongues a. The sheet B, preferably scored, as at 7, 8, is folded along the scoring 7 and thereby provided with the tongue-bearing end-flap 9. The sheet B is then folded along the scoring 8 and thereby provided with a second or intermediate flap 10, and the two flaps 9 and 10 are then manipulated to dispose the tongue-bearing flap 9 under or within the second flap 10, as shown. The uppermost card s is then engaged at its openings or slots b with the tongues c of the flap 9, the tongues c interlocked with marginal edge-portion of the second card, and the entire series of cards thereby secured flatwise to and upon the sheet B, as shown in Figure 1.

The sheet or back B, may, as also shown in Figure 1, have a marginal extension along one vertical edge, as at 11, which may, in turn, be provided with suitable openings 12, so that the index may be conveniently bound within a loose-leaf ring-binder, or, if desired, the backing-sheet, as, for instance, sheet B', may be of such dimensions to similarly support, as shown in Figure 6, two sets of the cards A, and be foldable into book-form.

Preferably each card A is provided on a line in approximately the horizontal plane of the lower wall of its side-recess 1 with a transverse series of cut-outs, slits, or slots 13, whereby the one card may be conveniently hingedly bent or folded to expose its rear surface, as well as also the front surface of the next card A, for the convenient reception of written matter and the like. And, as also seen in Figure 7, one or more of the cut-outs or slots 13 may be utilized in mounting upon the card suitable approximately U-shaped spring-clips 14, whereby additional cards C of any standard form may be detachably gripped and held flatwise over the respective card A, the card A in such event functioning as a hinged support for the card C.

The cards D illustrated in Figures 8 and 9 are substantially similar in all respects to the cards A, except that the opposed tongues $a^1$ thereof bodily project obliquely outwardly and downwardly for interlocking engagement at their tips 15 with the marginal edge portions of the alternately underlying cards, in the same manner as described in connection with widened portions 2 of the tongues $a$. Figure 9ª shows a backing-sheet B'' substantially similar to the backing-sheet B except that the same is equipped with a tongue $c'$ like the tongues $a'$ of the cards of Figures 8 and 9, the backing-sheet B'' being cooperatively connected with the cards D in substantially the same manner as are the cards A connected with the backing-sheet B.

It will be evident that by disengaging the upper marginal portion $y$ of a respective card from the tongues $a$ of the next second adjacent section or card, one or more of the individual sections or cards may be readily removed and replaced substantially at any point in the connected series, and additions and eliminations in the index or record thus quickly accomplished, the record or index being so broken at any desired point and again connected.

Normally and as connected to and supported upon the backing B, portions only of the several cards A or D are exposed and visible, but by hingedly bending the cards A along the line of the cut-outs or slots 13 or otherwise suitably flexing the respective connected cards, substantially the entire front surface area, as well as also substantially the entire rear surface area, of each card may be presented for the convenient entry of matters pertinent to the particular record.

Preferably, to facilitate placement and withdrawal of an index or record within or from a file or the like, such, for instance, as the file 16, illustrated in Figure 12, a U-shaped clip 17, Figures 13 and 14 provided with an index or identifying character, symbol, or the like 18 is engaged over and upon a side edge of one or more of the inner cards A and the back B. The clip 17 proper is thereby concealed on a plan view of the index, but efficiently serves to retain the back and cards together from relative sidewise movement when turned on edge and through its carried index character 18 enables the convenient and proper location of the record within and withdrawal from the file.

My new index or record is exceedingly flexible, is inexpensive in manufacture and maintenance, is readily increased and decreased in size to meet requirements, is readily manipulated as to size and for corrections and additions, and provides a most efficient visibly continuous, though sectional, means for the compilation of information, data, names, and entries for various purposes.

I am aware that changes in the form, construction, arrangement, and combination of the several parts of my new sectional record or index may be made and substituted for those herein shown and described without departing from the nature and principle of my invention.

Having thus described my invention what I claim and desire to secure by Letters Patent is:

1. In a sectional record, a section provided with a pair of horizontally aligned and opposed tongues and a pair of horizontally aligned and opposed slots, said tongues projecting obliquely outwardly and downwardly relatively to the section.

2. In a sectional record, a section provided with a pair of horizontally aligned and opposed tongues and a pair of horizontally aligned and opposed angular slots, said tongues projecting obliquely outwardly and downwardly relatively to the section.

3. A sectional record including a plurality of separate sections each provided with a pair of horizontally aligned and opposed tongues and a pair of horizontally aligned and opposed angular slots and adapted for inter-engagement at said tongues and slots in an imbricated series, said tongues projecting obliquely outwardly and downwardly relatively to the sections.

4. A sectional record including a plurality of separate sections each provided with a pair of horizontally aligned and opposed tongues and a pair of horizontally aligned and opposed angular slots and adapted for inter-engagement at said tongues and slots in an imbricated series, said tongues projecting obliquely outwardly and downwardly relatively to the respective sections and adapted at their tips for interlocking engagement with the upper marginal portion of a succeeding section.

5. In a sectional record, a section provided with a pair of horizontally aligned and opposed tongues and a pair of horizontally aligned and opposed angular slots, said slots being disposed adjacent the upper edge of the section and the lower edge of each thereof being disposed obliquely inwardly and downwardly to approximately the plane of the upper end of the necks of said tongues.

6. A sectional record including a plurality of separate sections each provided with a pair of horizontally aligned and opposed tongues and a pair of horizontally aligned and opposed angular slots and adapted for interengagement at said tongues and slots in an imbricated series, said slots being disposed adjacent the upper edge of the section and the lower edge of each thereof being disposed obliquely inwardly and downwardly to approximately the plane of the upper end of the necks of said tongues.

7. In a sectional record, a secton provided with a pair of horizontally aligned and opposed tongues and a pair of horizontally aligned and opposed angular slots, said section being provided with a series of cut-outs spaced from the slots for hingedly folding the section upon itself.

8. In a sectional record, a section provided with a pair of horizontally aligned and opposed tongues and a pair of horizontally aligned and opposed tongue-accommodating slots, said section being adapted for hinged folding on a line spaced from said slots and having an opening along said line, in combination with a second section disposed flatwise relatively to the first section, and a spring clip straddling the first section at said opening and gripping the second section for detachably securing the same to the first section.

9. In a sectional record, a first section provided with a pair of horizontally aligned and opposed tongues and a pair of horizontally aligned and opposed tongue-accommodating slots, said section being provided with a series of cut-outs spaced from said slots and forming a folding-line for hingedly folding the section upon itself, in combination with a second section disposed flatwise relatively to the first section, and a spring clip passing through one of said cut-outs and straddling the first section along said folding line and gripping the second section for detachably securing the same to the first section.

10. A sectional record including a plurality of separate sections each provided with a pair of horizontally aligned and opposed tongues and a pair of horizontally aligned and opposed angular slots and adapted for interengagement at said tongues and slots in an imbricated series, in combination with a back having a similar pair of tongues for engagement with the slots of the end one of said sections.

11. A sectional record including a plurality of separate sections each provided with pair of horizontally aligned and opposed tongues and a pair of horizontally aligned and opposed angular slots and adapted for interengagement at said tongues and slots in an imbricated series, in combination with a back provided at one end with superposed connected flaps, the under flap being provided at its side margins with a similar pair of tongues for engagement with the slots of the end one of said sections.

12. A sectional record including a plurality of separate sections each provided with a pair of horizontally aligned and opposed tongues and a pair of horizontally aligned and opposed angular slots and having interengagement at said tongues and slots in an embricated series, in combination with a back provided at an end with superposed connected flaps, the under flap being provided at its side margins with a similar pair of tongues for interlocking engagement with the slots of the end one of said sections and the marginal edge portion of the next adjacent section.

13. A sectional record including a plurality of separate sections each provided with a pair of horizontally aligned and opposed tongues and a pair of horizontally aligned slots and having interengagement at said tongues and slots in an imbricated series, in combination with a back having tongue and slot interengagement with the record, and an indexed-tab having engagement with one of said cards and the back for retaining the cards and back against relative sidewise movement and providing an index-symbol for the record.

14. A sectional record including a plurality of separate sections each provided with a pair of horizontally aligned and opposed tongues and a pair of horizontally aligned and opposed slots and adapted for interengagement at said tongues and slots in an imbricated series, in combination with a back having a similar pair of tongues for engagement with the slots of the end one of said sections.

15. In a sectional record, a section provided with a pair of horizontally aligned and opposed slots, in combination with a back folded upon itself at an end and thereby provided with a pair of connected superposed flaps, the under flap being provided with a pair of horizontally aligned and opposed tongues for engagement with the slots of said section.

16. In a sectional record, a section provided with a pair of horizontally aligned and opposed slots, in combination with a back folded upon itself at an end and thereby provided with a first flap presented towards the opposite end of the back and a second flap presented towards the first end of, and interposed between the first flap and, the back, the second flap being provided with a pair of horizontally aligned and opposed tongues for engagement with the slots of said section.

17. In a sectional record, a section provided with a pair of horizontally aligned and opposed obtuse angular slots, in combination with a back folded upon itself at an end and thereby provided with a pair of connected superposed flaps, the under flap being provided with a pair of horizontally aligned and opposed tongues for engagement with the slots of said section.

In testimony whereof, I have signed my name to this specification.

HERBERT O. ROSS.